(12) United States Patent
Schönemann

(10) Patent No.: US 6,824,803 B2
(45) Date of Patent: Nov. 30, 2004

(54) METHOD OF ROLLING OIL-CONTAINING AGRICULTURAL OR GRAIN PRODUCTS

(75) Inventor: Joachim Schönemann, Netphen-Deuz (DE)

(73) Assignee: Walzen Irle GmbH, Netphen (DE)

( * ) Notice: Subject to any disclaimer, the term of this patent is extended or adjusted under 35 U.S.C. 154(b) by 462 days.

(21) Appl. No.: 09/872,471

(22) Filed: Jun. 1, 2001

(65) Prior Publication Data

US 2002/0015773 A1 Feb. 7, 2002

(30) Foreign Application Priority Data

Jun. 3, 2000 (DE) .......................................... 100 27 757

(51) Int. Cl.$^7$ ................................................. A23P 1/00
(52) U.S. Cl. ........................................ 426/481; 426/518
(58) Field of Search ................................ 426/481, 486, 426/512, 518; 99/617

(56) References Cited

U.S. PATENT DOCUMENTS 4,897,440 A * 1/1990 Lo ............................... 99/617

* cited by examiner

*Primary Examiner*—George C. Yeung
(74) *Attorney, Agent, or Firm*—Friedrich Kueffner

(57) ABSTRACT

A method of using a rotatable roll for rolling oil-containing agricultural products or other types of cereals or foodstuffs. The roll has a roll body of metal and an outer covering of a non-metal material, especially synthetic material or a mixture of synthetic material and rubber.

1 Claim, 1 Drawing Sheet

METHOD OF ROLLING OIL-CONTAINING AGRICULTURAL OR GRAIN PRODUCTS

BACKGROUND OF THE INVENTION

1. Field of the Invention

The present invention relates to a method of using a roll having a roll body and an outer covering for processing foodstuffs. The present invention also relates to the roll for carrying out the method.

2. Description of the Related Art

Rolls are used for flocking and processing oil-containing agricultural or field products such as soybeans, corn, rape seeds, sunflower seeds or the like, but also for processing dried foodstuff products, such as in the manufacture of cereals, such as cornflakes or the like. When impurities are contained in the products to be processed and especially if these products contain hard kernels, point-like high forces are introduced into the roll surfaces which come into contact with the products; this is different than, for example, in the manufacture of steel where uniform forces act on the entire roll surfaces. The high point-like forces may result in structural changes in the roll surface, for example, in the case of cast rolls. In the worst case, these structural changes may result in ruptures which make the roll useless.

SUMMARY OF THE INVENTION

Therefore, it is the primary object of the present invention to provide a roll of the above-described type which does not have the disadvantages mentioned above.

In accordance with the present invention, the roll used for carrying out the present invention has a covering of a non-metal material, for example, synthetic material or a mixture of synthetic material and rubber.

The roll according to the present invention is used particularly for flocking oil-containing seeds or for processing other foodstuffs or raw materials for foodstuffs.

The covering of a non-metal material of the roll results in a high elasticity of the roll surface. The elasticity of the covering prevents permanent point-like indentations in the roll caused by kernels or other hard contents of the products to be rolled. This advantage is particularly significant when compared to brittle roll bodies of cast material. The flexibility is also significantly increased as compared to roll bodies of steel, so that the service life of such a roll provided with a covering is improved.

When the covering of synthetic material or a mixture of synthetic material and rubber is mounted on the roll body in the form of a jacket, it is no longer necessary to scrap the entire roll when a surface defect occurs. It is sufficient to exchange the covering of synthetic material. This results in a significant cost saving.

To ensure that the covering can exert a sufficiently high rolling pressure against the products to be rolled in spite of its flexibility, the hardness of the synthetic material used for the covering is in the range of the hardness of quenched and tempered steel. Consequently, the quality of the rolled product is not impaired.

The various features of novelty which characterize the invention are pointed out with particularity in the claims annexed to and forming a part of the disclosure. For a better understanding of the invention, its operating advantages, specific objects attained by its use, reference should be had to the descriptive matter in which there are described preferred embodiments of the invention.

DESCRIPTION OF THE PREFERRED EMBODIMENTS

Figure 1:
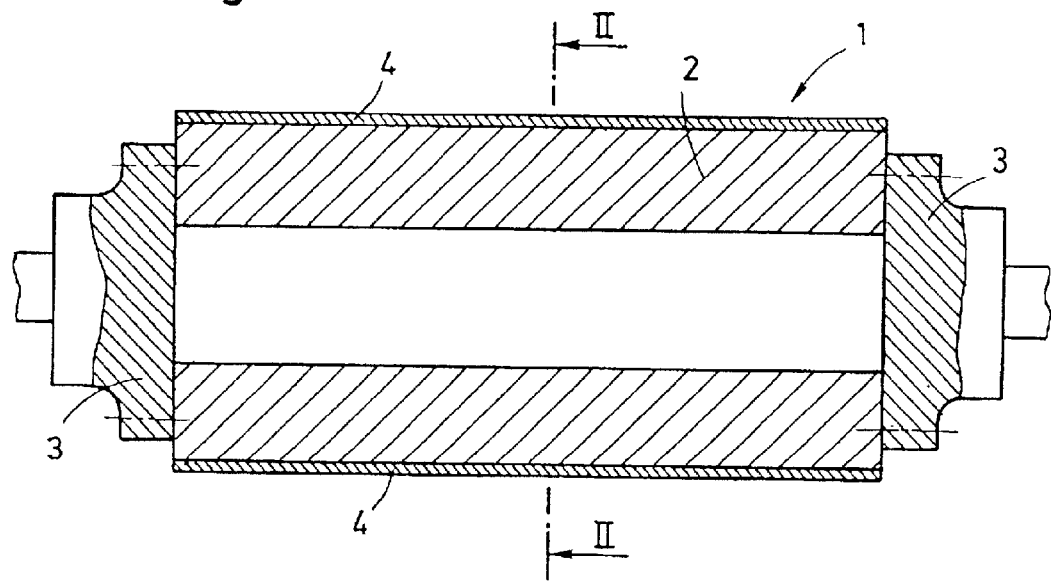
FIG. 1 is a sectional view of a roll according to the present invention.
Figure 2:
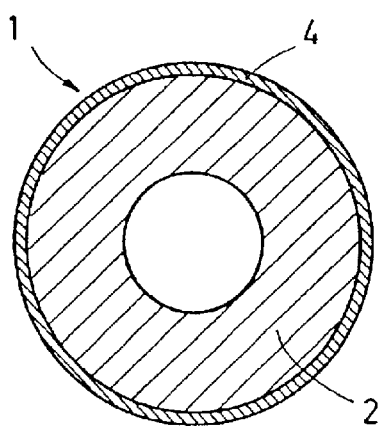
FIG. 2 is a sectional view taken along sectional line II—II in FIG. 1.

The drawing shows a roll 1 which is used for forming a pair of rolls. The roll 1 includes a roll body 2 which can be mounted by means of lateral journals 3. Both rolls are driven rolls. One of the rolls is a fixed roll and the other is a loose roll, wherein the gap between the rolls is adjusted in accordance with the product being processed.

As shown in the drawing, the roll body 2 is surrounded over its entire roll body length by a covering 4 which is fixedly mounted on the roll body 2, for example, by winding a synthetic material onto the roll body and subsequently vulcanizing the synthetic material; other methods can also be used.

The covering 4 is of a flexible, elastically deformable material, for example, a thermoplastic material or a mixture of synthetic material and rubber. The material has a high hardness and, thus, has a high resistance against the formation of indentations in its surface. Consequently, high nip or gap pressures can be achieved. Also, when appropriate synthetic materials are used, the resistance to deformations caused by heat, so-called hot spots, is very high.

In accordance with the present invention, rolls of the type of roll 1 are used for rolling oil-containing products, such as soybeans, corn, rape seed, sunflower seeds, or the like. The roll 1 is also used for flocking cereal and other grain products, for example, when manufacturing dry mueslis, cornflakes or the like.

The coverings 4 can be used for retrofitting existing roll bodies 2. It is additionally possible to continue using roll bodies 2 which already have slight surface defects because these defects are evened out by the covering 4 of synthetic material being placed on the roll body.

While specific embodiments of the invention have been shown and described in detail to illustrate the inventive principles, it will be understood that the invention may be embodied otherwise without departing from such principles.

I claim:

1. A method of rolling oil-containing agricultural or grain products with a rotatable roll having a roll body and an external covering of a non-metal material, for flocking the products, wherein the non-metal material of the external covering is a mixture of synthetic material and rubber, and wherein the mixture has a hardness equal to a hardness of quenched and tempered steel.

* * * * *